(12) United States Patent
Sonnendorfer et al.

(10) Patent No.: US 8,650,715 B2
(45) Date of Patent: Feb. 18, 2014

(54) SHELL FOR THE PUSHING HANDLE OF A TROLLEY

(76) Inventors: Horst Sonnendorfer, Puchheim (DE); Franz Wieth, Puchheim (DE)

( * ) Notice: Subject to any disclaimer, the term of this patent is extended or adjusted under 35 U.S.C. 154(b) by 0 days.

(21) Appl. No.: 13/056,685

(22) PCT Filed: Jul. 30, 2009

(86) PCT No.: PCT/DE2009/001063
§ 371 (c)(1),
(2), (4) Date: Jul. 13, 2011

(87) PCT Pub. No.: WO2010/012274
PCT Pub. Date: Feb. 4, 2010

(65) Prior Publication Data
US 2011/0131765 A1  Jun. 9, 2011

(30) Foreign Application Priority Data
Jul. 30, 2008  (DE) .................... 20 2008 010 201 U

(51) Int. Cl.
*B25G 1/10*  (2006.01)
(52) U.S. Cl.
USPC ................... 16/421; 16/436; 280/33.992
(58) Field of Classification Search
USPC ........ 16/421, 426, 430, 436, 904, 422, 110.1; D34/27; 280/33.992
See application file for complete search history.

(56) References Cited

U.S. PATENT DOCUMENTS

| 4,231,901 | A | * | 11/1980 | Berbeco ......................... 252/511 |
| 4,720,048 | A | * | 1/1988 | Maroney et al. ........... 280/47.34 |
| 4,955,914 | A | * | 9/1990 | Caniglia et al. ............... 606/235 |
| 6,065,764 | A | * | 5/2000 | Moseley .................. 280/33.992 |
| 6,158,640 | A | * | 12/2000 | Karp et al. ..................... 224/411 |
| 6,357,767 | B1 | * | 3/2002 | O'Quin et al. ............. 280/79.11 |
| 6,817,066 | B1 | | 11/2004 | Williams et al. |
| 6,964,382 | B2 | * | 11/2005 | Alexander et al. ............ 239/526 |
| 6,981,707 | B1 | * | 1/2006 | Dandy ..................... 280/33.992 |
| D521,207 | S | * | 5/2006 | Anderson et al. .............. D34/27 |
| D635,733 | S | * | 4/2011 | Willig et al. ................... D34/27 |
| 2002/0092132 | A1 | | 7/2002 | Kessler |
| 2009/0199360 | A1 | * | 8/2009 | Madanat ..................... 16/111.1 |
| 2010/0133768 | A1 | * | 6/2010 | Sonnendorfer et al. . 280/33.992 |

FOREIGN PATENT DOCUMENTS

| DE | 19843531 A1 | 3/2000 |
| DE | 202004009005 U1 | * 12/2005 |
| WO | 2005006911 A2 | 1/2005 |

* cited by examiner

*Primary Examiner* — William Miller
(74) *Attorney, Agent, or Firm* — Laurence A. Greenberg; Werner H. Stemer; Ralph E. Locher

(57) ABSTRACT

A shell for a handle tube of a shopping cart or trolley. The shell has improved properties compared with a conventional, round, simple shell and has zones made of different materials.

11 Claims, 3 Drawing Sheets

SHELL FOR THE PUSHING HANDLE OF A TROLLEY

BACKGROUND OF THE INVENTION

1. Field of the Invention
2. Technical Field

The invention relates to the shell of a pushing handle for a trolley.

A multiplicity of shopping trolleys are in use in which the pushing handle is a tube which has curved regions and is fixedly connected to the chassis.

A pushing handle is provided with the shell during the production of the trolley after the pushing handle has been fixedly connected to the chassis. It is then no longer possible to slip the shell along the axis of the pushing handle.

The known shells are substantially cylindrical plastic parts which have a slot. Fitting is effected by the shell being positioned parallel to the pushing handle and pressed over the pushing handle with a force which is directed transversely to the axis of the pushing handle, with at the same time the slot of the shells being expanded.

On account of the elasticity of the material, the slot then closes again, and the shell therefore snaps over the pushing handle.

As an anti-rotation locking means, the shell has pins which are integrally formed on the inside thereof and correspond with holes in the pushing handle.

A disadvantage with the known shells is the fact that they have to be made entirely of an elastic material in order to be able to snap over the pushing handle. Due to this requirement for elasticity, the choice of materials is adversely restricted.

In an adverse manner, the known elastic materials which are used for the known shells have haptics which are often felt to be "sticky".

A further disadvantage of the elastic shells can be seen in the fact that, during normal use, high leverages must not occur between shell and pushing handle, since otherwise the elastic shell is pulled off the pushing handle again. This makes it virtually impossible for the shell to have a shape differing from the shape of the pushing handle or for additional elements, for example an advertising surface, to be integrated into the shell.

The elastic materials have the property that they are a very good insulator. As a result, the trolley, in an adverse manner, is not "grounded" via the pushing person and the electrostatic charge, which always takes place, increases until a voltage is reached which leads to a sparkover function when touching metal parts of the trolley.

DISCLOSURE OF THE INVENTION

Technical Problem

The problem addressed by the invention is to provide a novel shell for pushing handles in which a combination of materials having low elasticity and non-elastic materials can be used and the shape of the shell differs from the shape of the pushing handle.

The shell has an important role with regard to the haptics and ergonomics of the entire trolley therefore the shape of the shell is an essential feature. The material properties of the shell are likewise important. A further problem addressed by the invention is therefore to improve the haptics, ergonomics and material properties of a pushing handle.

Technical Solution

This problem is solved by the shell according to the invention of the pushing handle for a trolley.

The ideas which have led to the emergence of the present invention proceeded on the assumption that a multi-part shell can be fitted on the transport handle without all the materials used for the shell having to be elastic for this purpose.

The individual parts of the shell are connected to one another and to the pushing handle in a positive-locking manner. The positive locking of the parts can be realized, for example, by tongue and groove joints. The positive locking between the shell and the pushing handle is effected by additional elements of the shell according to the invention, which additional elements engage in the pushing handle.

Advantageous Effects

Due to the present invention, it is possible to give the shell a shape which can differ from the shape of the pushing handle.

The individual regions of the shell can be made of different materials. As a result, it is possible to specifically produce the individual regions from a material which is especially suitable for a certain special function going beyond the basic function of the pushing handle shell.

It is thus advantageously possible for a region of the shell to have a transparent design in order to arrange an advertising surface behind the transparent region.

It is also possible to design another region of the shell to be electrically conductive, for in this way the electrostatic charge which is generated when pushing the trolley is always discharged via the pushing person.

It is also possible to produce the shell from a material which gives off ions in order thus to immediately kill again as far as possible all the germs which have been left behind on the shell by the user of the trolley before the next user touches the shell.

BRIEF DESCRIPTION OF THE DRAWINGS

The invention is explained in more detail below with reference to several figures.

In the drawing.

DESCRIPTION OF THE INVENTION

Figure 1:
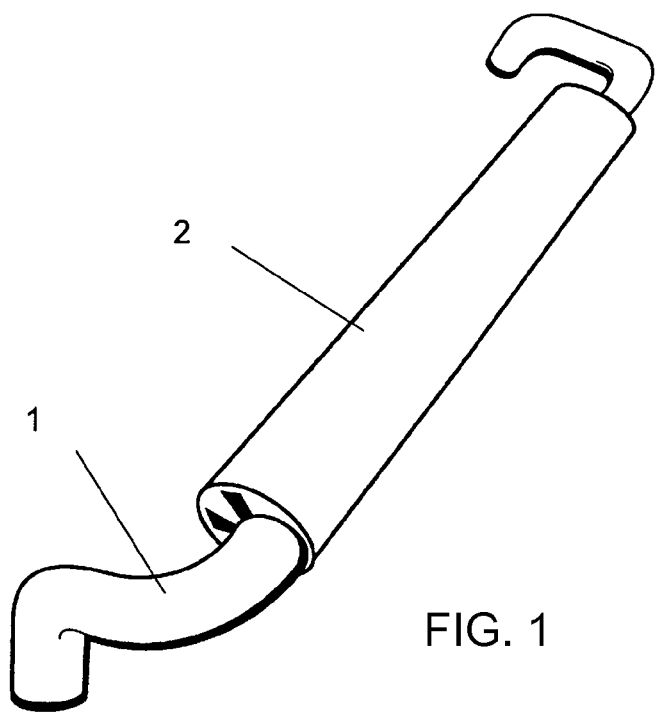
FIG. 1 shows a pushing handle of a shell according to the invention.

FIG. 1 shows the pushing handle 1. This pushing handle 1 is fixedly fastened to the chassis of the shopping trolley (not shown here). The pushing handle has a substantially straight center part, adjoining which on both sides is a curved end region. The shell 2 is mounted on the straight center part of the pushing handle 1.

Figure 2:
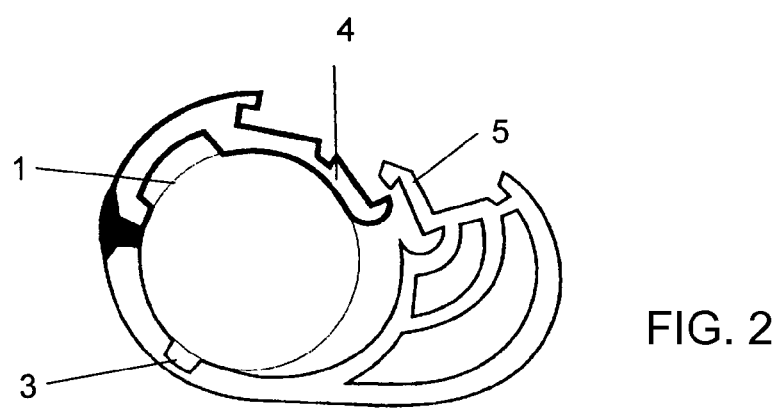
FIGS. 2-4 show a sectional illustration through the shell.

FIG. 2 shows a section through the shell 2. One region 3 is of relatively thin-walled design and is flexible like a film hinge. The regions 4 and 5 are provided with grooves and latching lugs, the function of which will be described in more detail later. The flexible region 3 enables the shell 2, which otherwise has low elasticity, to be opened out. As a result, it is possible to snap the shell 2 onto the pushing handle 1 transversely to the axis of the pushing handle 1.

Figure 3:
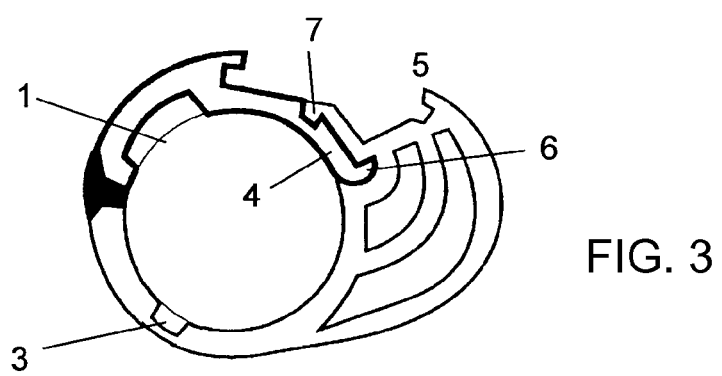

FIG. 3 shows the shell 2 in the closed state. The end of the region 4 now lies under the opposite region 5.

A latching lug 6 at the edge of the region 4 and a latching lug 7 at the edge of the region 5 engage in a respective groove in the opposite part. As a result, the shell 2 is secured against radial widening.

Figure 4:
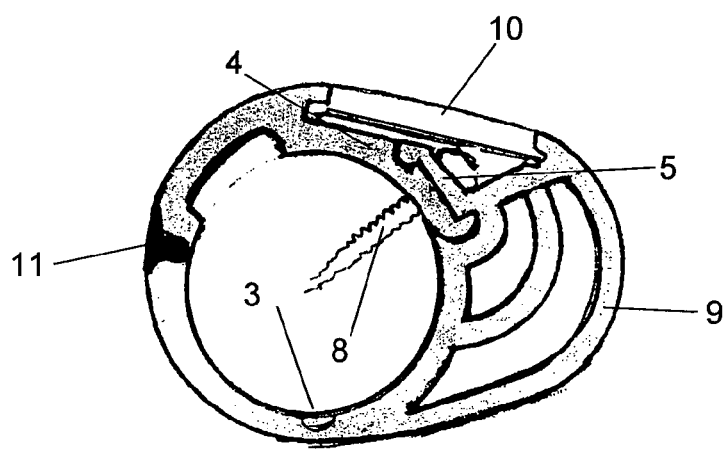

FIG. 4 shows the ready fitted shell 2 in section. A screw 8 passes through the two regions 4 and 5. The screw 8 in turn ends in the pushing handle 1.

The shell 2 has a shape differing from the cylindrical shape of the pushing handle 1. In the sectional illustration in FIG. 4, the region furthest away from the axis of the pushing handle 1 is provided with the reference numeral 9. Due to the positive locking which the screw 8 produces between the shell 2 and the pushing handle 1, forces which act on the shell 2 in the region 9 are transmitted to the pushing handle 1. Radial rotation of the shell 2 on the pushing handle 1 is not possible, nor is an axial displacement of the shell 2 along the pushing handle 1.

The screw 8 is concealed by the strip 10 inserted in a flush manner. The strip 10 can also be made of a transparent material in order to serve as a viewing window for a printable surface located behind it. Company logos or advertising information can be accommodated on the printable surface.

In addition, a region 11 made of a material that is more electrically conductive is included in the shell 2. This electrically conductive region 11 is in contact with the pushing handle 1 and then serves for the specific discharge of the electrostatic charge produced when pushing the trolley, which discharge, however, cannot be perceived by the user.

Since there is a wide choice of materials on account of the design according to the invention, it is advantageously possible to use for the shell 2 a material which has an antibacterial effect and therefore contributes to increased hygiene. It is also possible to use an electrically conductive material for the shell overall, or a material which consists of a renewable raw material.

Figure 5:
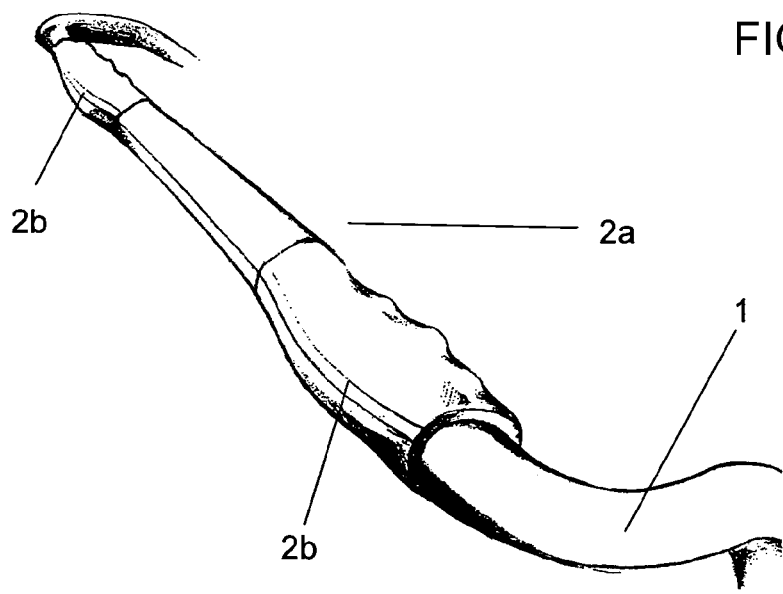
FIG. 5 shows a configuration of a shell having a plurality of sections.

FIG. 5 shows a development of the shell. Here, the shell 2 consists of a center part 2a and side parts 2b.

The center part 2a has an extruded profile which can be produced quickly and economically.

The side parts 2b have an ergonomically distinct shape. In normal operation, the user of the trolley will mainly touch the side parts 2b. It is therefore advantageously possible to limit the outlay for materials having haptically and hygienically improved properties to the side parts 2b and to use inexpensive materials for the center part 2a.

Uniform coloring results in a uniform appearance of the entire shell 2.

The side parts 2b preferably have an ergonomically distinct shape with palm rest and finger grips.

Such a shape cannot be produced by the extrusion process but rather by the injection molding process. The material used for the side parts 2b is advantageously a material which gives off ions and can thereby kill germs on its surface.

Figure 6:
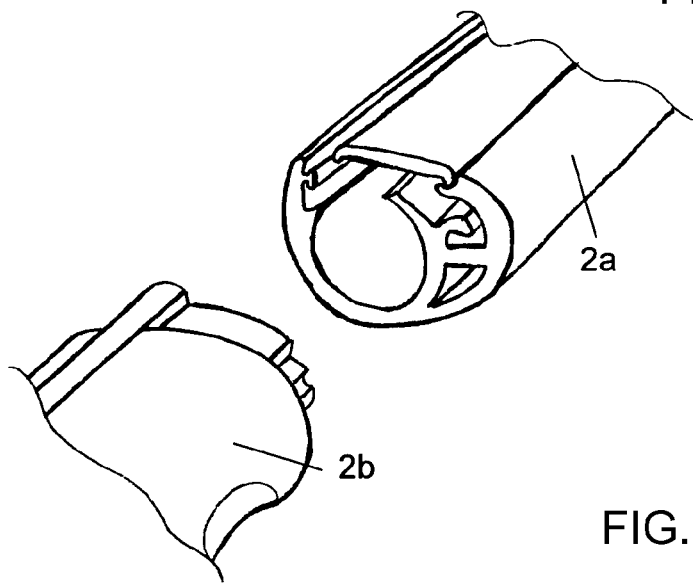
FIG. 6 shows the connection between two sections of the shell.

FIG. 6 shows the connecting region between the center part 2a and the side part 2b of the shell 2 in a perspective illustration. The side part 2b can be pushed into the center part 2a and a continuous transition is obtained between the two parts with shape and friction grip.

In a development of the invention, it is possible to use a shortened center part and to use the region thereby freed on the pushing handle for the fitting of a functional part.

Such a functional part would be attached to the pushing handle in an integrated manner between the side part and the center part of the shell. A deposit lock or a holder for a shopping assistant can be attached as such a functional part to the handle.

Figure 7:
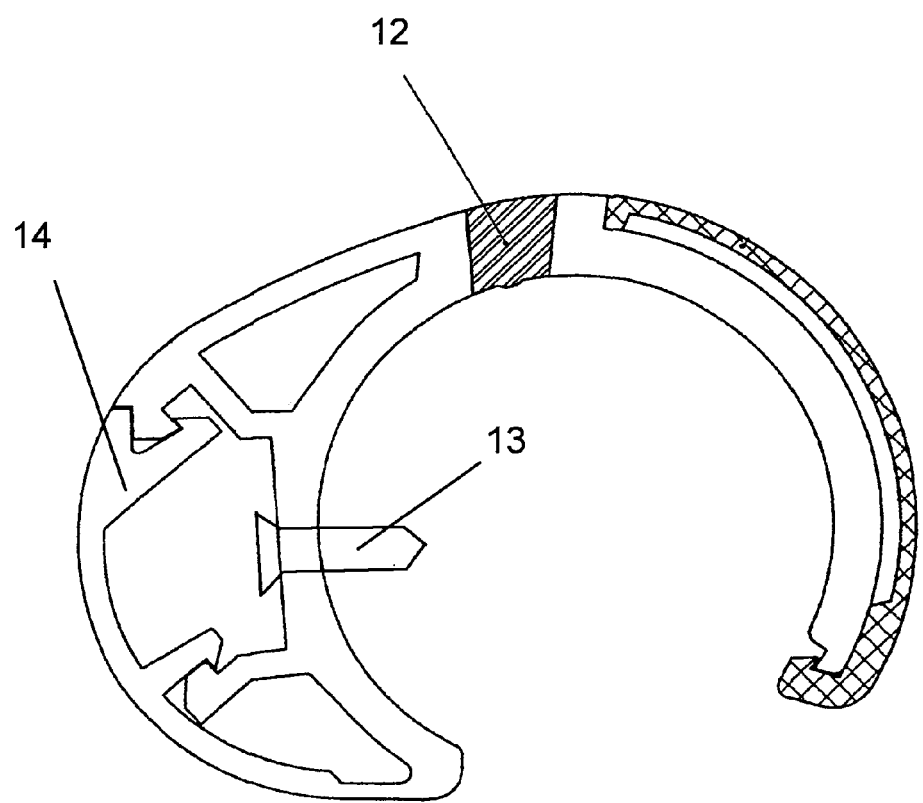
FIG. 7 shows a further configuration.

FIG. 7 shows an exemplary embodiment in which the shell 12 does not completely enclose the handle tube. A region of about 270-300 degrees of the handle tube is covered by the shell 12. The region that is not covered is selected in such a way that it is not visible when using the shopping trolley.

The shell 12 is secured against lateral displacement and radial rotation by pins or screws 13. The pins 13 project into holes in the handle tube, said holes often already being present in the handle tube, because simple sleeves around the handle tube which have studs on their inside which engage in holes in the handle tube are commonly used.

The pins or screws 13 are preferably located in that region of the shell 12 which is of oval configuration and has a certain volume. The volume in which the pins or screws 13 are located is closed by a closing clip 14, as a result of which the pins or screws 13 are no longer visible.

In this respect, the embodiment according to FIG. 7 is especially suitable for exchanging the simple sleeves for the shell according to the invention, with all the advantages thereof.

The present invention offers the possibility of using a material which has an antibacterial effect and therefore advantageously contributes to increased hygiene. It is also possible to use an electrically conductive material or a material which consists of a renewable raw material.

The design according to the invention permits quick and simple fitting and likewise makes possible quick and simple exchange of the shell.

The invention claimed is:

1. A pushing handle of a trolley, comprising:
a shell having regions made of mutually different materials, said shell or said regions of said shell being formed with a material having an electrically conductive effect, said shell having a longitudinal axis, said regions including a flexible wall region and two adjacent regions adjacent said flexible wall region, said flexible wall region extending along said longitudinal axis and having a reduced wall thickness relative to said two adjacent regions, said reduced wall thickness defining a film hinge between said two adjacent regions and allowing attachment of said shell around a center part of the pushing handle.

2. The handle according to claim 1, wherein said shell has a length along said longitudinal axis, said length is divided to define a multi-part shell with individual parts made of mutually different materials.

3. The handle according to claim 2, wherein said individual parts of said shell are connected to one another and to a basic part of the pushing handle in a positive-locking connection.

4. The handle according to claim 1, wherein the pushing handle has a basic shape and said shell has a shape substantially different from the basic shape of the pushing handle.

5. The handle according to claim 1, wherein said shell or regions of said shell are formed with a material having an antibacterial effect.

6. The handle according to claim 1, wherein said shell or regions of said shell are formed with a material having a transparent property.

7. The handle according to claim 1, wherein said shell has a length along said longitudinal axis, said length is divided into side parts and a center part, and wherein said side parts are made of a material different from a material of said center part of said shell.

8. The handle according to claim 1, wherein said two adjacent regions partially overlap one another in a closed position of said shell.

9. The handle according to claim 8, wherein a fastener passes through an overlapping area of said two adjacent regions in the closed position of said shell.

10. The handle according to claim 1, wherein said two adjacent regions are each provided with a respective latching lug and a groove, said latching lug and said groove of a first one of said two adjacent regions for engaging with said latching lug and said groove of a second one of said two adjacent regions to secure said shell against radial widening.

11. The handle according to claim 10, wherein a fastener passes through said two adjacent regions at a position between said latching lugs and said grooves in a closed position of said shell.

* * * * *